Patented Sept. 19, 1922.

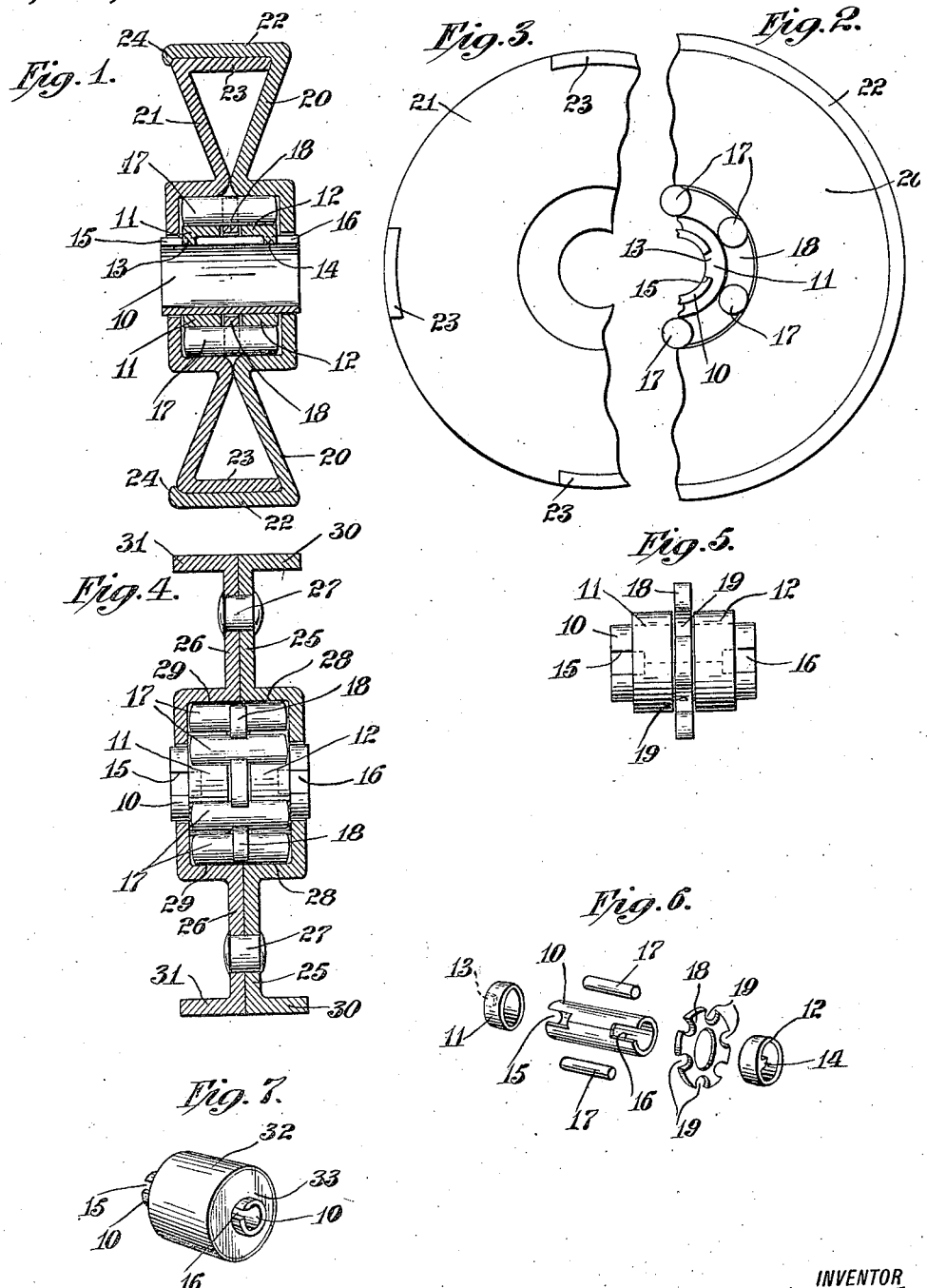

1,429,224

UNITED STATES PATENT OFFICE.

THOMAS W. BRYANT, OF TORRINGTON, CONNECTICUT.

ROLLER BEARING.

Application filed January 8, 1921. Serial No. 435,830.

*To all whom it may concern:*

Be it known that I, THOMAS W. BRYANT, a citizen of the United States of America, residing at Torrington, Litchfield County, Connecticut, have invented a new and useful Roller Bearing, of which the following is a specification.

My invention relates to constructions which are particularly desirable to use as wheels for casters, skates, trolleys and trucks. It is also applicable to bearings for bicycles, sewing machines, carpet sweepers, sliding doors, and other purposes.

The main object is to provide a simple, durable but inexpensive construction which will run with a minimum of friction.

In its preferred form, I provide inner and outer bearing members formed of sheet metal, a series of rollers interposed between them, and a separator ring. Preferably, the inner bearing member consists of two collars on a tubular support. The outer bearing member may be formed in various ways.

Figure 1 is a transverse section of one form of wheel embodying the improvements of my invention.

Fig. 2 is a fragmentary inner face view with one part removed.

Fig. 3 is a fragmentary inner face view of the part omitted from Fig. 2.

Fig. 4 is a transverse sectional view of a modified form of wheel embodying my invention.

Fig. 5 is a side view of the inner bearing member.

Fig. 6 is a perspective view showing the various parts of the inner bearing member.

Fig. 7 is a perspective view of another embodiment of my invention.

In its preferred form, the inner bearing member includes a central tubular support 10 with bearing collars 11 and 12 mounted on opposite sides of its center. These collars are preferably provided with tongues 13 and 14 adapted to fit in the slots 15 and 16 to take up end thrust. The opposite ends of the rollers 17 are adapted to bear on the cylindrical outer walls of the collars 11 and 12. To keep the rollers in their proper operative relation, I preferably provide a ring 18 which may be termed a separator having notches 19 in the periphery to receive the rollers. These notches 19 are preferably circular in form so that they may be easily made. This separator may be made of non-corrosive metal such as brass if desired.

The outer bearing member in the form shown in Fig. 1 consists of the two parts 20 and 21 in which the inner member loosely fits. In this case, the member 20 has a tread portion 22 formed integral therewith, and the member 21 has flanges 23 serving as stops. The curled edge 24 of the tread holds the parts securely in their proper relation.

It will be clear that the support 10 may be formed of a tube or of sheet metal, bent or shaped into tubular form, at a minimum of expense. The bearing collars 11 and 12 may also be formed of sheet metal or of tubes, and will insure an accurate bearing surface even though the tube 10 is not perfectly true. The tubular support 10 enables me to use this bearing on any form of spindle, and as the support 10 projects beyond the opposite faces of the bearing, the tube may obviously be clamped without binding upon the bearing itself. It will be understood, of course, that the separator 18 is loosely mounted so as to allow free travel together with the rollers with respect to the support and the stationary bearing collars or rings. The rollers and the bearing surfaces may be hardened if desired.

In the form shown in Fig. 4, the outer bearing member consists of two annular discs 25—26 riveted together at a number of points as at 27, and provided with the bearing walls 28 and 29, and the outer flanges 30 and 31.

In the form shown in Fig. 7, the outer bearing member consists of the cup-like member 32 and the end disc 33. Such a construction is obviously adapted to be used as a bearing in various ways. If desired it may be provided with any suitable form of tread. It may also be used as a shaft support or bearing.

I claim:—

1. In a roller bearing, a tubular support having slots in its opposite ends, bearing collars having lugs positioned in said slots, an outer bearing member and means connected therewith enclosing said collars and forming abutments therefor, and rollers engaging said collars and guided by said abutments.

2. In a roller bearing, a split tubular support, bearing collars mounted on and embracing said tube at opposite ends to hold said tube in shape and having a space between them, rollers engaging the collars, a spacing ring mounted between the collars in the space and having arms projecting out between the rollers, and a housing forming an abutment for the rollers and collars, said tube projecting out beyond the sides of the housing.

3. In a roller bearing, a split tubular support having slots in its opposite ends, bearing collars having lugs positioned in said slots, an outer bearing member enclosing said collars and forming end abutments therefor, and rollers interposed between said outer bearing member and said collars.

THOMAS W. BRYANT.